July 5, 1932.  H. E. TUCKER  1,865,803
DRAFT GEAR
Filed July 22, 1930    2 Sheets-Sheet 1
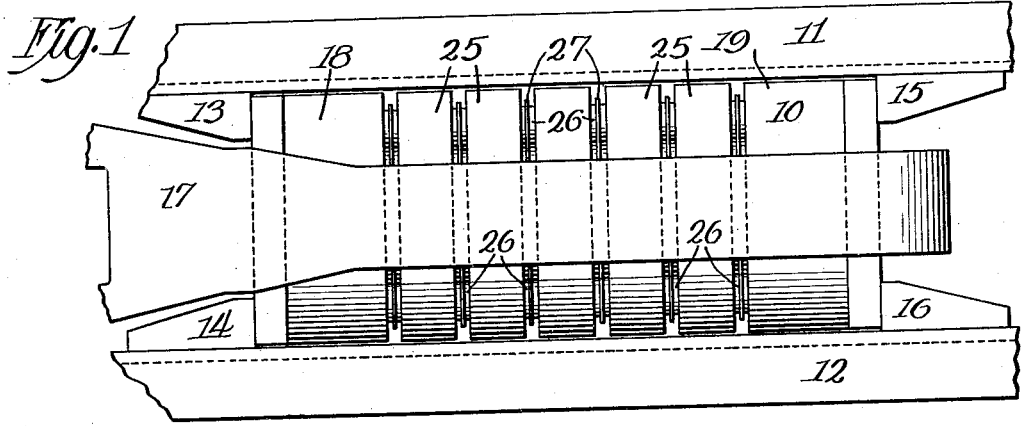
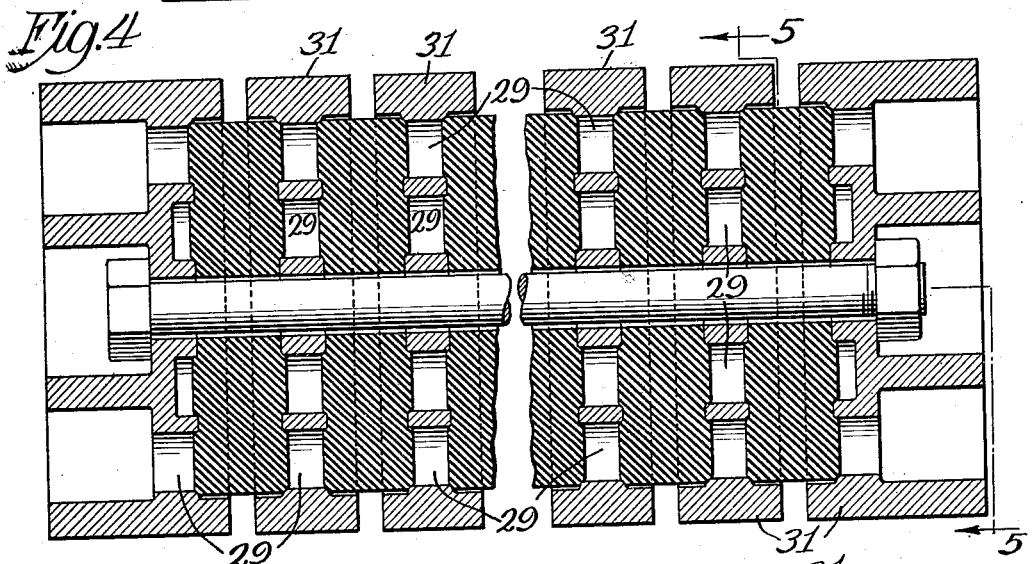
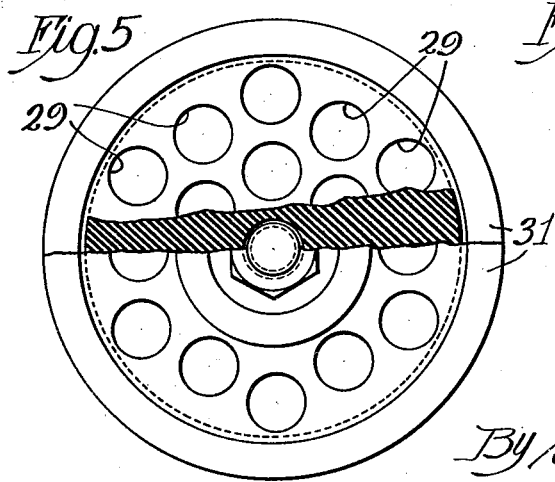
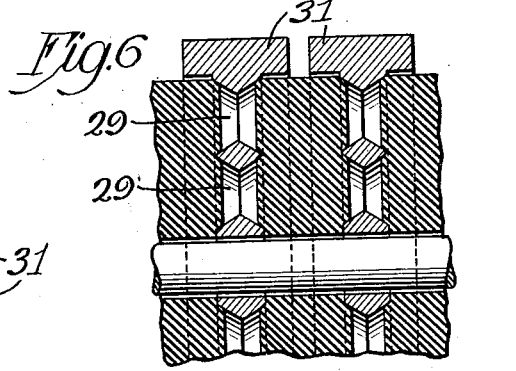
Inventor
Herbert E. Tucker
By Gillson, Mann + Cox Attys.

July 5, 1932.  H. E. TUCKER  1,865,803
DRAFT GEAR
Filed July 22, 1930  2 Sheets-Sheet 2
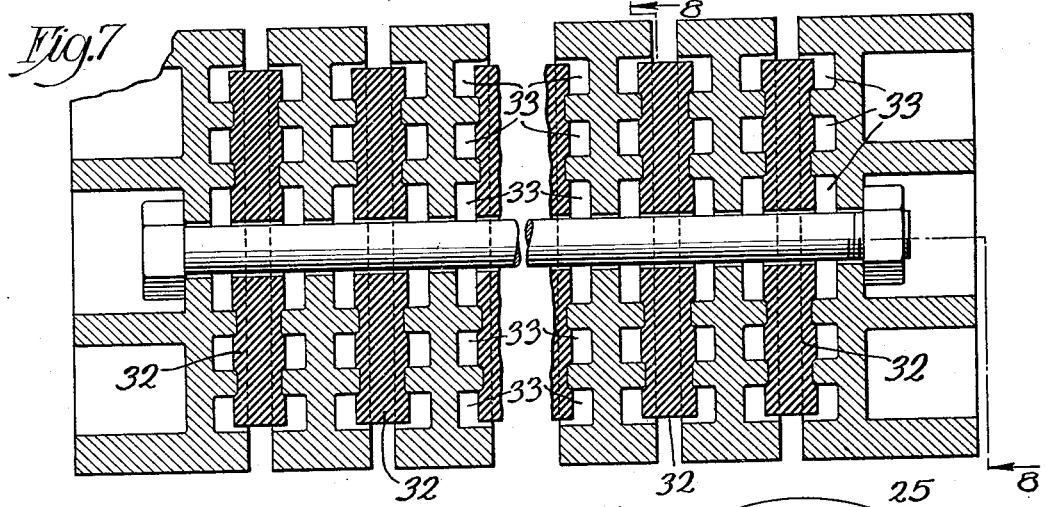
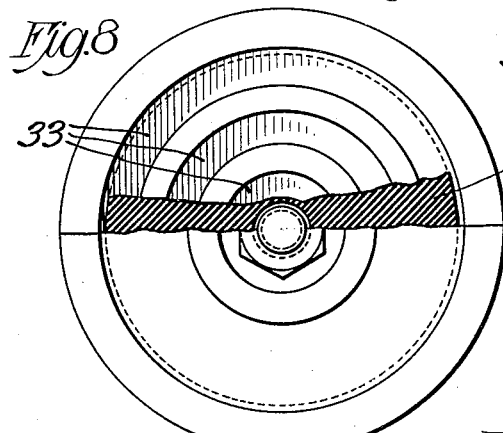
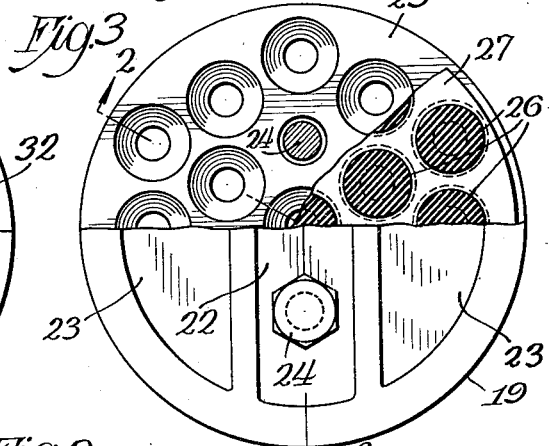
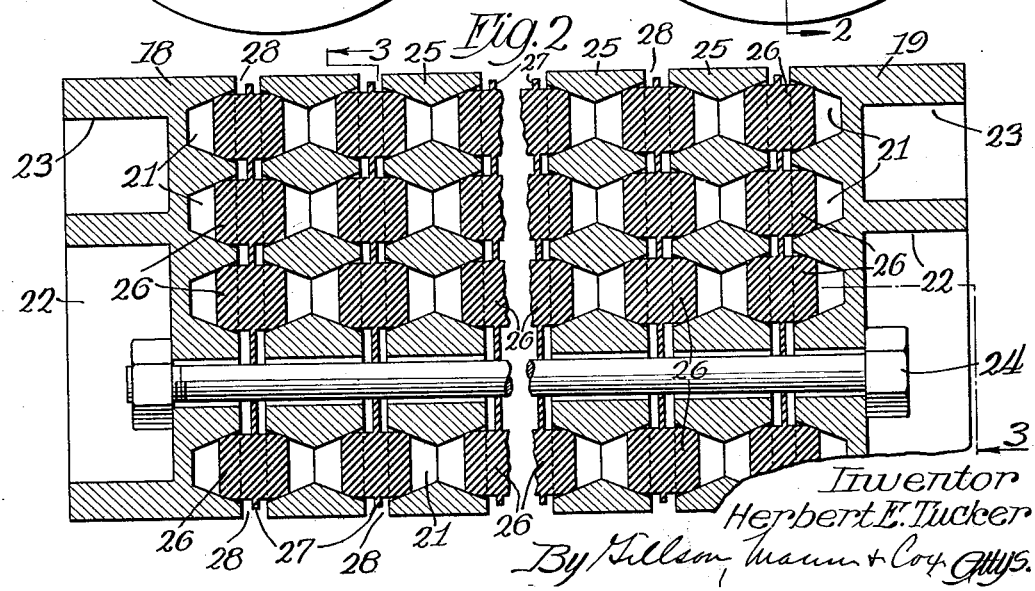
Inventor
Herbert E. Tucker Patented July 5, 1932

1,865,803

UNITED STATES PATENT OFFICE

HERBERT E. TUCKER, OF CHICAGO, ILLINOIS, ASSIGNOR TO CARDWELL WESTINGHOUSE COMPANY, A CORPORATION OF DELAWARE

DRAFT GEAR

Application filed July 22, 1930. Serial No. 469,839.

This invention relates to draft gears and has for its objects the provision of simple means for producing the resisting friction; to reduce the number of parts which may be worn in the operation of the gear; to produce a gear which will not be affected by foreign particles or effect of the weather; and to produce a gear which will maintain its operating efficiency over a considerable period of time.

These and other objects of the invention will become apparent from the specification and the appended drawings in which Fig. 1 illustrates the improved gear as applied to a standard railway car;

Fig. 2 is a longitudinal section of the preferred form of gear, the section shown as indicated by the lines 2—2 in Fig. 3;

Fig. 3 is an end view, partially in section, of the gear shown in Fig. 2, taken on the lines 3—3;

Fig. 4 is a longitudinal section of alternative form;

Fig. 5 is an end view and partial sectional elevation of the gear shown in Fig. 4 taken on the line 5—5;

Fig. 6 is a detail showing of a further modification of the gear;

Fig. 7 is a longitudinal section of a still further modification of the gear; and Fig. 8 is an end view of the gear shown in Fig. 7, partially in section as indicated by the lines 8—8 on Fig. 7.

Broadly considered, the gear utilizes for its resisting means the internal friction of a resilient material and utilizes the self-restoring properties of the material as the restoring force. In this aspect, the gear may consist of end plates through which the pressure is applied and interposed resilient material, which is distorted upon the compression of the gear. It is not my purpose to compress the resilient material to any substantial degree, and I may use materials which are as a practical matter nearly incompressible. Consequently, broadly considered, my gear also has incorporated in it spaces into which the resilient material may be forced upon the compression of the gear and out of which it flows to assume its normal shape when the compressional forces on the gear are removed.

Certain embodiments of this invention chosen for the purposes of illustration are herein specifically set forth.

With reference to the drawings, Fig. 1 illustrates the gear, generally indicated by 10, placed between the draft sills 11 and 12 of a standard railway car. The gear is maintained in position by the forward draft lugs 13 and 14 and the rear lugs 15 and 16 and is surrounded as usual by the yoke 17. Other parts of the coupler and car form no part of this invention and consequently are not shown.

With reference to Fig. 2, it will be seen that the gear is composed of two end members or plates 18 and 19 which bear on their inner faces a plurality of conical depressions 21, 21 etc. The outer faces of the plates are cored out as at 22, 23 to give clearance to the retaining bolts 24 and also to reduce the weight of the casting. The pressure plates 25, 25, which in this embodiment are disks, bear a series of holes arranged in the same manner as the conical depressions in the end plates. They are placed, as shown, between the plates 18 and 19 and maintained in position by the bolts 24.

The walls of the holes through the disks taper outwardly from the center of the disk to the surface so that a hole of hour glass or double conical form is produced. A cylinder of resilient material 26 having tapering ends, is placed in and partially fills each of the holes and spaces the disks and plates apart from each other when in the normal position of the gear. This material may be gutta-percha, balata, or other condensible resilient gums. It is rubber in the form shown.

In order to afford the easy assembly of the gear, it may be convenient to connect all of the cylinders in any one group by the thin diaphragm 27 of the same material as the cylinders 26, which will hold each cylinder in position to articulate with the depressions in the plates.

The operation of the gear is as follows: With a pull or push imparted by the yoke to the end plates, the device is compressed and the resilient cylinders are distorted and forced further into the conical holes in the pressure disks. The resistance which is developed is largely the internal molecular friction of the resilient medium, but some friction may be developed between the surface of the holes 21 and the cylinders 26. When an oversolid load is applied to the gear, the resilient compound is completely driven into the holes 21, 21. The spaces 28, 28 between the disks and between the disks and plates are closed so that a solid column then takes up the oversolid load. The resilient nature of the material in the cylinders causes the gear to expand immediately upon the release of the pressure.

In Figs. 4, 5, and 6, it will be noticed that there are a series of holes through the disk in the same manner as illustrated in Fig. 2, but that the surface of the disk bears an irregular configuration, indicated in Fig. 4. The resilient material is squeezed into the holes 29 of the disks 31 when the gear is compressed.

Figs. 7 and 8 illustrate a form of gear in which rings or other projections take the place of the ring of holes through the thicker plates shown in Fig. 2. In this instance, upon the compression of the gear, the resilient pad 32 is squeezed into the spaces 33, 33, upon the compression of the gear.

With care in the choice of the compound and by the use of proper anti-oxydants to minimize the destructive effect of heating, such gears will give long and reliable service and are free from the objection that an expensive casing is cut and chewed by the operation of the friction mechanism.

What I claim, therefore, is:

1. A friction draft gear comprising a plurality of plates bearing substantially aligned opposing flaring depressions in their faces, a plurality of cylinders of resilient material having tapering ends maintained in the depressions, and into which depressions the cylinders may be further forced upon the compression of the gear, and means serving to maintain the gear in assembled relationship.

2. In friction draft gear comprising a plurality of plates having substantially aligned opposing conical depressions in their faces, a plurality of cylinders having tapering ends of resilient material maintained in the depressions, and into which depressions the cylinders may be further forced upon the compression of the gear, and means serving to maintain the gear in assembled relationship.

3. In a friction draft gear, a pair of opposed end-plates, an interposed series of plates, resilient material, having conical projections, between the plates and between the plates and end-plates, each of said plates having material thickness and having a plurality of holes therethrough, the walls of the holes tapering outwardly from the central plane of said plates to produce a substantially conic section and into which section the projections of the resilient material enters and may be forced upon the compression of the device.

4. A friction draft gear comprising a plurality of plates bearing substantially aligned opposing depressions in their faces, a plurality of cylinders of resilient material maintained in the depressions of each pair of plates, and a diaphragm of like resilient material connecting all of the cylinders between each pair of disks.

In testimony whereof I affix my signature.

HERBERT E. TUCKER.